United States Patent [19]

Sprung et al.

[11] Patent Number: 4,651,914
[45] Date of Patent: Mar. 24, 1987

[54] MOBILE PIPE MILL

[75] Inventors: Douglas L. Sprung, Camano Island, Wash.; John P. D. Sprung, Surrey, Canada

[73] Assignee: Pipemakers, Inc., Calgary, Canada

[21] Appl. No.: 647,179

[22] Filed: Sep. 4, 1984

[51] Int. Cl.⁴ .............................................. B23K 9/12
[52] U.S. Cl. ........................................ 228/7; 228/9; 228/17.5; 180/9.46; 219/130.21
[58] Field of Search .................... 228/7, 8, 9, 15.1, 17, 228/17.5; 180/9.1, 9.46; 280/81 R, 81 B, 81.5; 296/24 R; 219/8.5, 10.53, 59.1, 60 R, 61.2, 130.21, 124.34, 110; 72/7, 51, 52, 166, 170, 173, 174, 245, 247

[56] References Cited

U.S. PATENT DOCUMENTS

| | | | |
|---|---|---|---|
| 2,729,123 | 1/1956 | Breedon et al. | 72/247 |
| 2,774,263 | 12/1956 | Leufven | 72/247 |
| 3,014,118 | 12/1961 | Vassar | 228/17.5 |
| 3,251,332 | 5/1966 | Vassar | 228/17.5 |
| 3,535,484 | 10/1970 | Snow et al. | 228/104 |
| 3,701,871 | 10/1972 | Schafer | 219/8.5 |
| 3,762,624 | 10/1973 | Sprung | 228/17 |
| 3,900,077 | 8/1975 | Gee et al. | 180/9.46 |
| 4,142,237 | 2/1979 | Yamasaki | 228/104 |
| 4,391,116 | 7/1983 | Yogo | 72/166 |
| 4,481,801 | 11/1984 | deVersterre et al. | 72/245 |
| 4,532,404 | 7/1985 | Boillot et al. | 219/130.21 |

FOREIGN PATENT DOCUMENTS

2837284 3/1979 Fed. Rep. of Germany ...... 228/102

Primary Examiner—M. Jordan
Attorney, Agent, or Firm—Kenyon & Kenyon

[57] ABSTRACT

A pipe forming apparatus provided with microcomputer control of the welding temperature and, when for a mobile pipe forming apparatus, the speed of vehicle and speed of the milling operation. Where the pipe forming apparatus is mobile, it is further provided with a propulsion and steering system, the computer measuring the speed of the apparatus and the pipe manufacturing speed and passing that information to the microcomputer. The microcomputer then controls the relative mill speed and vehicle speed to ensure that during operation the pipe milling apparatus moves ahead at an equal speed but opposite direction to the metal strip being formed into pipe.

30 Claims, 22 Drawing Figures

MOBILE PIPE MILL

BACKGROUND OF THE INVENTION

The present invention relates to the manufacture of pipes, and more particularly to apparatus for the manufacturing of continuous lengths of metal pipe from a flat metal strip.

Stationary and mobile pipe forming devices for making a continuous length of metal pipe from flat metal strip material are well known in the prior art. See, for example, descriptions of mobile pipe forming mills in Vassar U.S. Pat. No. 3,014,118, issued Dec. 19, 1961; Sprung et al., U.S. Pat. No. 3,145,758, issued Aug. 25, 1964; Tsuyama, et al., Canadian Pat. No. 1,160,436, issued Jan. 17, 1984, Anderson Canadian Pat. No. 1,119,849, issued Mar. 16, 1982; and Ferreroele, Canadian Pat. No. 627,513, issued Sept. 19, 1961.

It is extremely important in such line pipe mills to ensure that the temperature of the weld is maintained within an appropriate range. If the weld becomes too hot or is heated too long, the edges of the metal strip being welded will fold or there will be burn through. If the weld temperature is too low or the weld is not heated long enough, a cold weld results. In either case, testing of the pipe from the mill would reject such a pipe. The improperly welded section of pipe would have to be cut and a properly welded one reinserted. Most of these prior art mobile and stationary pipe mills have not had proper temperature control for the weld.

As well, particularly for mobile pipe making apparatus, it has been necessary for the operator to control the speed of pipe making and also the rate of progress of the mill-carrying vehicle. It is necessary to consistantly and accurately match these two speeds, in opposite directions, to ensure that the ground speed of the pipe issuing from the rear of the mill is exactly zero. When this situation does not exist, the production of downgraded pipe results, again this pipe having to be cut out and replaced. If the pipe is made faster than the vehicle is advancing, it backs up and tries to push the mill-carrying vehicle, causing slowdown of the pipe mill and burn through of the weld. If the vehicle is going too fast relative to the pipe mill, the pipe is pulled through the mill too fast with the result that the drives on the vehicle risk becoming sheared, or portions of the pipe are cold welded or skidded on the ground and damaged, necessitating additional cut outs. In either case such cut outs slow down the pipe line manufacture and increase production costs.

Additionally, problems of manoeuvrability and weight exist in prior art mobile line pipe mills, particularly where a two vehicle apparatus has been used. Such devices turn and back up often with great difficulty, and have trouble moving over uneven, spongy or muddy terrain such as in tundra or swamp areas.

It is an object of the present invention to provide an improved pipe mill which overcomes many of the problems of such prior art mills. While the present invention will be described particularly in relationship to a mobile pipe mill in which pipe is made in one direction while a vehicle on which the mill is carried moves at equal speed in the opposite direction, it will be clear to one skilled in the art that many of the aspects of the present invention may be applied to stationary pipe mills.

SUMMARY OF THE INVENTION

According to the present invention there is provided a pipe forming apparatus comprising in combination carriage, a means for propelling and means for steering the carriage and a pipe forming mill supported on the carriage. The pipe forming mill includes a cradle for carrying a coil of an elongated metal strip, means for shaping the metal strip from the coil into an elongated cylindrical member with confronting longitudinally extending edges, welding means to join the longitudinally extending edges of the cylindrical member to form a continuous pipe, and adjustable drive means to pass the strip from the coil through the pipe forming apparatus for shaping and welding and to pass the pipe from the pipe forming apparatus. The pipe forming apparatus is further provided with a microcomputer and a temperature sensor device electrically associated with the microcomputer to detect the temperature of the weld during operation of the apparatus and pass that information to the microcomputer. The microcomputer is electronically associated with the welding means and programmed to control the heat output of the welding means so that, during operation, the weld temperature is maintained at a predetermined level.

In another embodiment of the invention, a means is electronically associated with the microcomputer for measuring the carriage speed and the pipe manufacturing speed and passing that information to the microcomputer. The microcomputer is programmed to control the relevant mill speed and vehicle speed to ensure that during operation the pipe manufacturing apparatus moves ahead at an equal speed but in a opposite direction to that of the metal strip being formed into pipe.

The microcomputer is also preferably used, as will be described in more detail hereinafter, to control the pressure exerted on the metal strip by the pipe shaping means and the positioning of the pipe shaping means, to warn of the end of the metal coil and, where a Turk's head mechanism is used at the end of the pipe mill for final sizing or bending of the line pipe produced, for orientation of that Turk's head mechanism. As well, the microcomputer maybe used to control steering of the apparatus.

BRIEF DESCRIPTION OF THE DRAWINGS

These and other objects and advantages of the invention will become apparent upon reading the following detailed description and upon referring to the drawings in which:

FIG. 10 is an enlarged perspective view of a bearing chock supporting one of the rolls of FIGS. 7, 8 or 9, from the inboard or driven in.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims. In particular, while the invention will be described in association with mobile pipe mills, as previously stated herein, and as will be readily apparent to one skilled in the art, many of the aspects of the present invention intended to be covered hereby are equally applicable to a stationary pipe forming mill.

DETAILED DESCRIPTION OF THE DRAWINGS

In the following description, similar features in the drawings have been given similar reference numerals.

Figure 1:
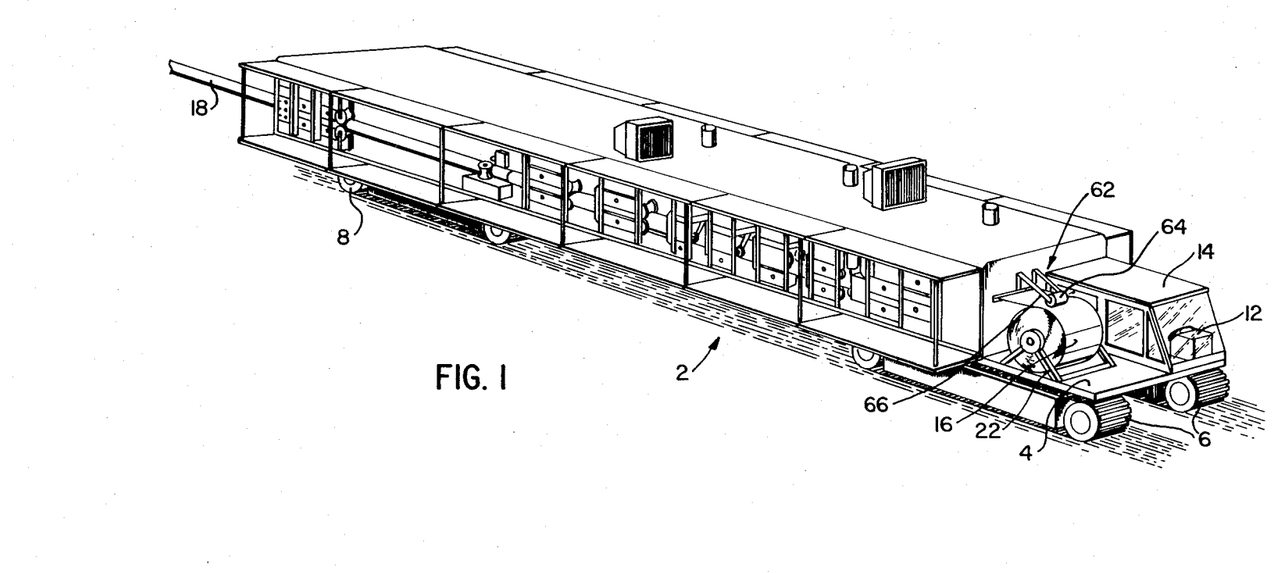
FIG. 1 is a perspective view of a mobile pipe forming apparatus or mill according to the present invention.

Turning to the drawings, as can be seen in FIG. 1 there is a mobile pipe forming apparatus 2 mounted generally on a carriage 4 which carriage itself is mounted on a pair on front tracks 6 and a pair of rear tracks 8. Each pair of tracks move on a rigid carbody 10, (FIGS. 3, 14a, 14b, 14c) the carbody in each case being centrally, pivotably secured to the underside of carriage 4 for rotation about a vertical axis in a horizontal plane to permit sterring of the apparatus. An appropriate steering mechanism 12 is provided in cab 14 at the front of carriage 4.

Also at the front of carriage 4 is normally positioned a coil of flat strip metal material 16, mounted to feed from the coil as the coil rotates about a horizontal axis. Coil 16 is passed to metal forming apparatus on carriage 4, and leaves carriage 4 from the rear, in a continuous length metal pipe 18 during operation of the device which will be described in more detail hereinafter. Each of the tracks 6 and 8 are individually powered by means of appropriate motors 20, supplied with electrical tachometers and controllable by the operator in cab 14.

Figure 2:
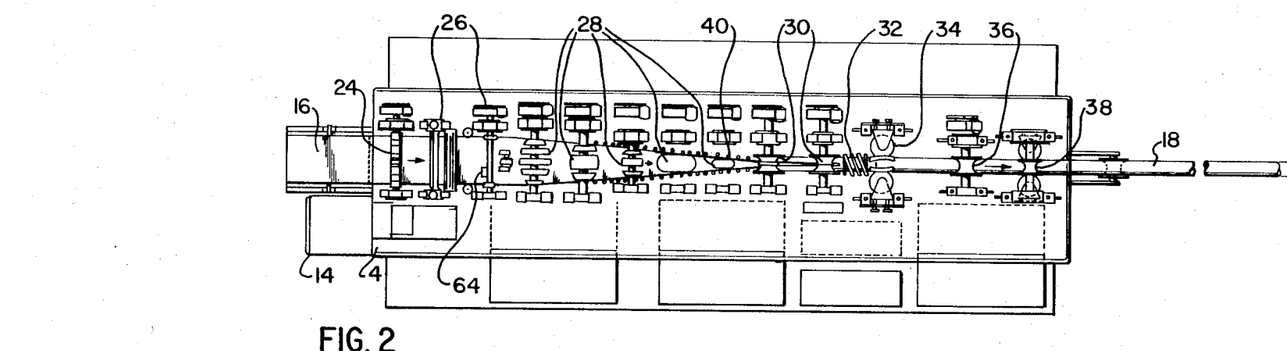
FIGS. 2 and 3 are respectively schematic views from the top and side of the components of the mill of FIG. 1, mounted on different tracks.
Figure 3:
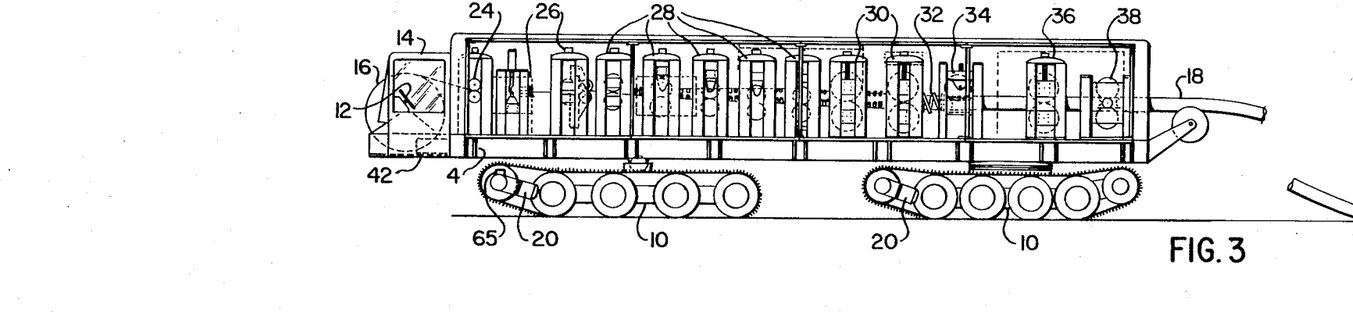

As can be seen in FIGS. 2 and 3, coiled metal strip 16, held in cradle 22, during operation is passed between pinch rolls 24 and them moved through rolls 26 where the longitudinal edges of the metal strip are sheared as required to provide proper size and a uniform edge; then through breakdown and forming rolls 28 where the edges of the metal strip 16 are upwardly curved and a generally U-shaped curved form is achieved; then passed to fin pass rolls 30 where the strip 16 is shaped into an elongated cylindrical member with confronting, slightly spaced, longtudinally extended edges; through induction welder 32, having a higher or medium frequency, and weld rolls 34 where the longitudinally extending edges of the cylindrical member are joined to form a continuous pipe, through pull out and size rolls 36 and finally through Turk's head rolls 38 for sizing and straightening or bending, after which the continuous pipe line is passed from the rear of apparatus 2. Each of these operations is illustrated schematically in FIGS. 6a through 6g. Between the forming rolls 28 and fin pass rolls 30 are a series of laterally moveable. hydraulically or mechanically actuated shoes 40 provided with bearing surfaces, for bearing against the moving metal strip material 16, which bearing surfaces are made from ultra high molecular plastic having low frictional characteristics. These shoes 40 bear against the metal strip from the sides and assist in bending it into its final cylindrical shape prior to welding.

Figure 4:
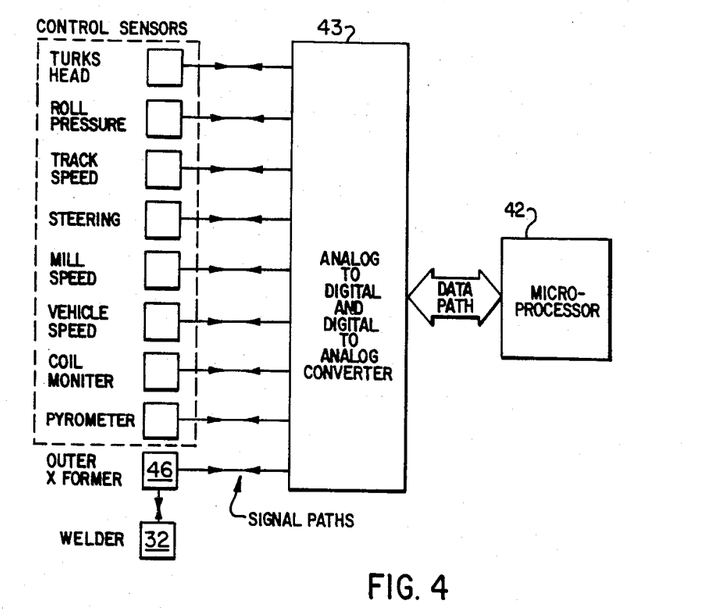
FIG. 4 is a schematic block diagram of the microcomputer and its control functions in the mill of the present invention.

Provided in cab 14 or in any other suitable location is an appropriate microcomputer 42, which will be described hereinafter, is set up and programmed to control many of the functions and operations of the pipe making apparatus or mill. These operations and functions are generally described in the schematic drawing of FIG. 4 to which reference will be made from time to time hereinafter. In the preferred embodiment of the present invention, there are several aspects for computer control and/or monitoring for the mobile pipe mill. These include weld temperature monitoring and control, mill speed monitoring and control, vehicle speed monitoring and control, roll pressure monitoring and control, vehicle steering, Turk's head mechansim control and coil monitor. A separate microcomputer 42 may govern each of these aspects, or a single computer may be provided which monitors and controls them all. For each aspect, the computer can supply its monitoring and controlling function many times second. If more than one computer is provided, each one of the computers can communicate to any other computer to signal the status of each aspect or feature which is monitors and controls. The computers could be arranged so that any other computer could take up the monitoring and control function if another one failed. Computerized monitoring and control of these various aspects of the mill operation will be described now in more detail.

1. Computer Monitoring And Control Of Welding Temperature

Figure 5:
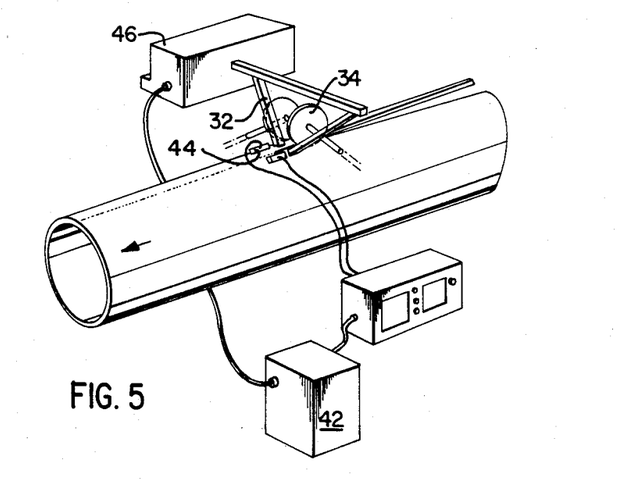
FIG. 5 is a detailed perspective view of the welding and temperature sensor mechanism according to the present invention.
Figure 6A:
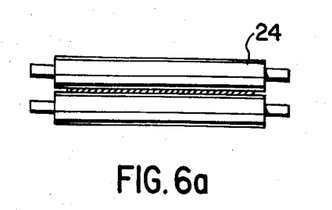
FIGS. 6a, 6b, 6c, 6d, 6e, 6f and 6g are schematic views respectively of the drawing, forming, welding, sizing and straightening or bending stages of the mill operation according to the present invention.
Figure 6B:
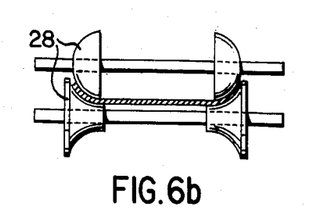
Figure 6C:
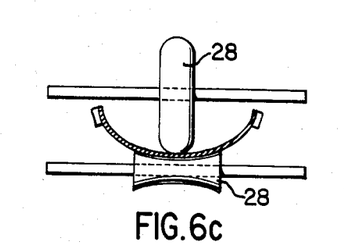
Figure 6D:
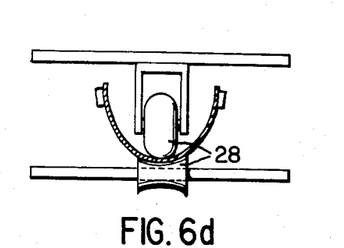
Figure 6E:
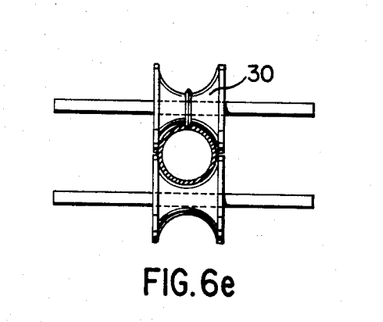
Figure 6F:
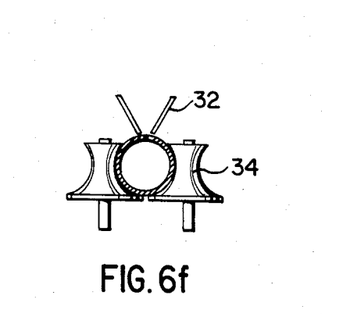
Figure 6G:
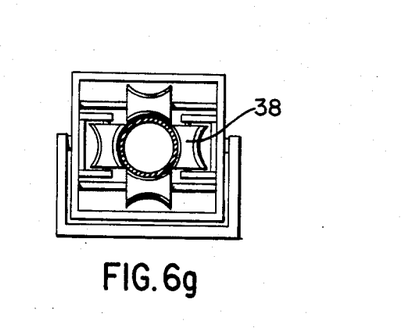

The weld temperature is measured by a non-contact sensor, which is preferably an optical pyrometer 44. This temperature will be signaled to computer 42 which will control the output transformer 46 of the welder. If the weld temperature goes too low from the pre-set range, the computer will cause the output of the welder to increase. If the temperature becomes too high, exceeding the pre-set range, the computer 42 will lower the output of the welder 32. The readings will be made many times a second to provide a control that is faster than that which can be achieved manually. The temperature range can be pre-set in the computer or indicated by the mill operator.

The weld temperature can be affected by both the welder output and the speed of the material through the mill. As the mill speeds up the welder temperature will decrease, eventually becoming too low. The computer will then increase the welder output. This process will occur much faster than can be controlled manually. This process can also occur at the same time as other functions of the mill and vehicle are changed. As the mill speed will affect the temperature, changing the mill speed will automatically cause the computer to change appropriately the weld temperature, thus ensuring a better weld in the pipe. In conventional mills, the weld temperature is interpreted by the mill operator by the weld colour or by watching a temperature displayed. This type of control will take longer to adjust. A manual control can also be adversely affected if the operator becomes distracted. If the operator is otherwise distracted in a mill, the temperature may change without being observed. This may cause poor welds.

2. Monitoring And Control Of Roll Pressure

Figure 7:
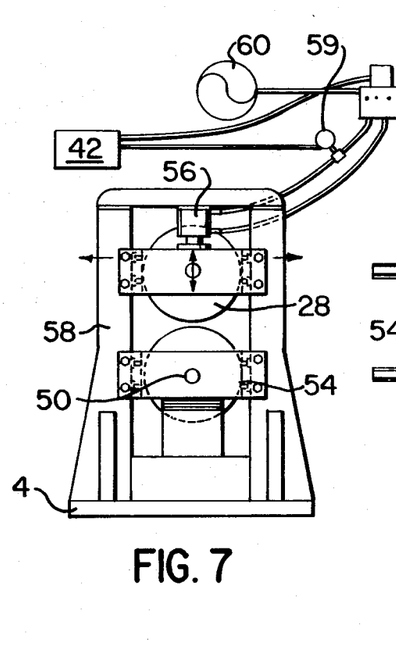
FIG. 7 is a side view, of a pair of forming rolls, chock and chock stands, illustrating schematically vertical computerized control of the positioning of the rolls according to the present invention.
Figure 8:
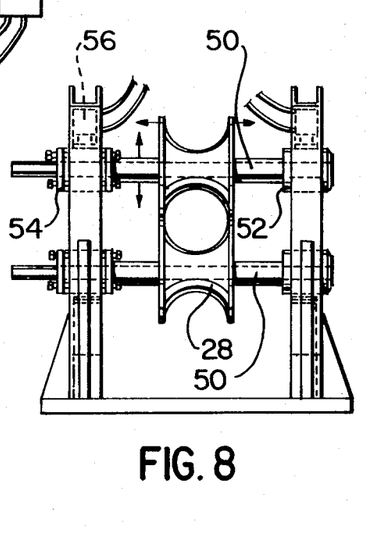
FIG. 8 is a rear view of the rolls, chock and stand of FIG. 7.
Figure 9:
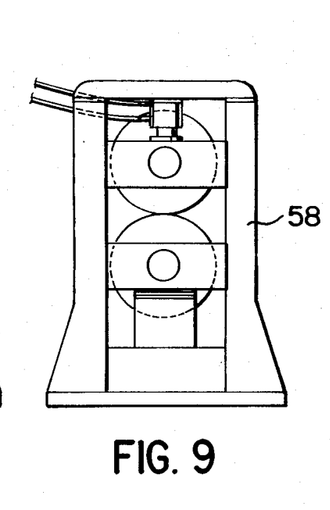
FIG. 9 is a side view, from the other side, of the rolls, chock and chock stand of FIG. 7.

As can be seen in FIGS. 7, 8 and 9, forming rolls 28 are each mounted on a shaft 50 which has bearings 52 and bearing chocks 54 at each end. The bearing chocks 54 are adjusted in a vertical plane either by means of screw jacks (not shown) or hydraulic cylinders 56. In the case of hydraulic cylinders the oil pressure to each cylinder, which is situated at the ends of the shaft 56, attached to the chocks 54, is equal. Thus the force exerted by each of the rolls in a particular roll stand 58 is equal. The pressure of the hydraulic system can be measured on the hydraulic fluid. The signals from a pressure sensor 59 can be fed to computer 42, which computer also controls the operation of hydraulic pump 60. (In the case of an electric system the pressure can be measured by a load sensor and the computer can control the electric motor operating the jack screw.) The mill operator can manually set the roll pressure and then indicate to the computer that the pressure is to be maintained. Computer 42 will then adjust the pump (or motor) to maintain the pressure. Under certain cases, such as the end of a coil of metal, computer 42 can reduce the pressure as the end of the metal leaves each roll stand 58. This will ensure that a roll will be made to press directly against its opposite mate with nothing in between. Computer 42 can be forewarned that the end of the metal strip is coming, by means of coil counter 62 (FIG. 1).

3. Coil Counter

As can be seen in FIG. 1, the small wheel 64 that is on arms 66 presses against the coil of metal. The angle of arm 66 can be measured as well as the speed of rotation of the wheel. If the diameter of the wheel is known it will allow the length of metal to be measured as the metal unwinds and goes into the mill. The length of a coil can be recorded if desired in the computer 42 and retrieved later. The length of each coil and the angle of the arm can indicate when the end of the coil is approaching. The angle can be compared to the angle indicated when there is no coil in the mill and the length of a coil of metal can be approximately determined beforehand. Computer 42 may indicate to each of the other functions (such as roll pressure) when the end of metal is near.

4. Mill Speed

The mill speed, i.e. the speed at which the metal strip 16 is passed through apparatus 2, may be selected as required by the operator. Computer 42 controls the actual roll drive motors (not shown) to achieve the desired speed. The mill speed may also be determined by the vehicle speed, as will be explained subsequently, by using the vehicle speed as the basis of measurement. In this case the computer will control the roll drive motors and there will be an upper limit set in the computer logic for the mill speed.

A reading of the mill speed will be made from the r.p.m. of one of the drive shafts 50 of one of the rolls. Readings are preferably taken many times each second to provide accurate control for each of the other functions.

5. Vehicle Speed

Apparatus 2 according to the present invention, when set up as a mobile pipe mill, may operate in one of three modes: vehicle to move only; mill to operate only—as a stationary mill; mill speed and vehicle speed to match ("mill match"). In the case of "mill match", the vehicle speed can be made to match the mill speed, or the mill speed can be made to match the vehicle speed. The former case will be the one used more often. The vehicle speed is preferably controlled to match the mill speed as the mill speed affects most of the other functions of the mill. The mill may be operated in a stationary mode and then changed for the vehicle to match the mill speed. When such a change occurs during operation of the mill, the change must occur without stopping of the mill operation.

As previously indicated, the vehicle tracks 6 and 8 are each powered by motors 20, these motors being either electric or hydraulic. The computer can, by speeding up a track, cause the vehicle to be steered. When moving straight in one direction, all of the tracks can be controlled to alter the vehicle speed. The speed can be measured from the track motor and thus signaled to the computer. The computer can, in the mill match mode, cause the vehicle speed to match the mill speed.

In the operation of the pipe mill as a mobile pipe mill, the mill should move ahead at an equal speed but opposite direction to the metal being formed into pipe. It is then important that the vehicle speed be matched to the pipe manufacturing speed for an effective differential of about zero. Attached to one of the motors which drive the sizing rolls, or any other mill shaft, a tachometer 64 (FIG. 2) is mounted which feeds the r.p.m. to computer 42. Attached to one of the shafts which drive the vehicle another tachometer 65 (FIG. 7) is mounted which also feeds the r.p.m. to the computer. The computer compares the r.p.m.'s of each and if the comparison indicates that either vehicle speed or mill speed is greater, it can either slow down the faster one or increase the lower one, depending upon which control the designer wishes to activate.

6. Vehicle Steering

Figure 14A:
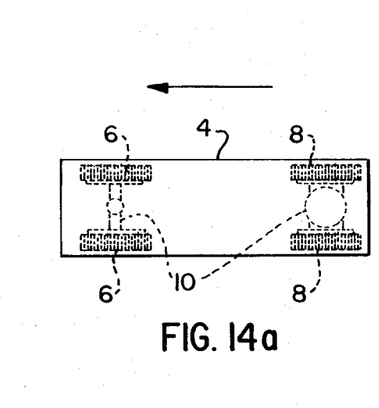
FIGS. 14a 14b and 14c are top, schematic views of the carriage and tracks of the apparatus according to the invention illustrating different directions of motion for the carriage.
Figure 14B:
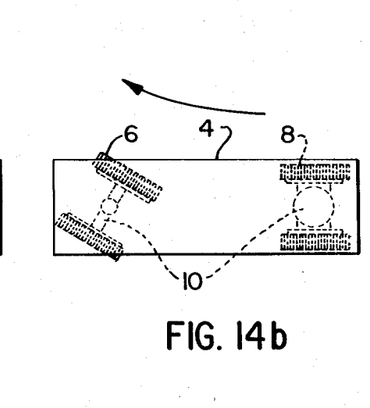
Figure 14C:
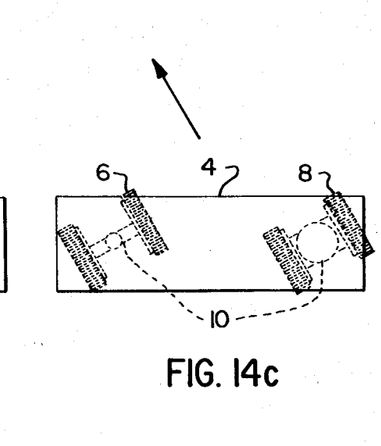

The angle of tracks 6 or 8 in relation to the mill frame can be measured and this signaled to computer 42 to control the various track speeds required to maintain a desired angle. This will allow the mill operator to indicate a turn from using steering mechanism 12, say to the right. The computer 42 will cause the front left track 6 to speed up and start turning the front track and associated carbody 10 to the right (FIG. 14b). The computer will control the speed of the left track to maintain the turn as long as the operator indicates. When a turn is started a predetermined distance is measured and then the rear track can be turned in the opposite direction to match the angle of the turn of the front track. This will cause the carriage 4 to swing in a shorter radius than otherwise would be obtained. The rear tracks 8 can be made to turn in the same direction as the front tracks 6, thus allowing carriage 4 to "crab" sideways (FIG. 14c). The speeds of the tracks are each controlled by computer 42 to initiate, maintain and terminate all of these actions.

7. Turk's Head Mechanism Control

Figure 11:
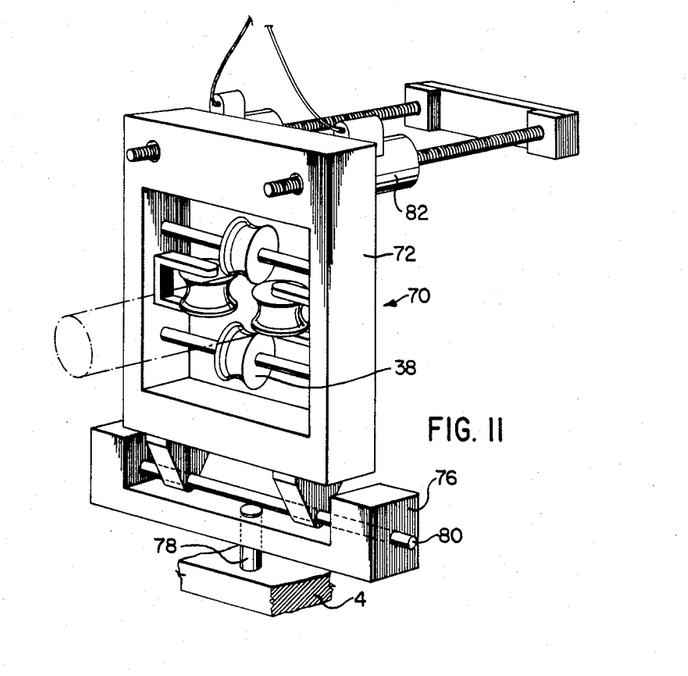
FIG. 11 is a perspective view of a Turk's head mechanism as used on the pipe forming apparatus according to the present invention.

At the end of the mill there is usually located a 4-roll stand called a Turk's head 70 (FIG. 11). A frame 72 holds four rolls 38 on a base 76 which is mounted to pivot horizontally on a vertical shaft 78, the axis of rotation passing through the center line between the rolls. Base 76 has a hinge mount 80 between it and the carriage 4 of the mill on which it is secured, the hinge mount being in the horizontal plane and allowing back and forth movement of frame 72. At the two top corners of frame 72 are shaft mounted gear boxes 82 which are motor driven and controlled by computer 42. By causing both motors to turn in the same direction, the computer causes frame 72 to rock one way or the other. Both motors turned in the other direction cause the frame to rock in the other direction. By turning the motors in opposite directions frame 72 is caused to swivel about a vertical axis on shaft 78. The amount of rocking and turning can be measured by the number of turns and the direction of turning of each motor. The angle of rotation can be selected by the mill operator or by angle of turn for the vehicle as signaled by the vehicle speed and steering functions of the computer. In this way, a certain degree of bend can be made in the pipe leaving the apparatus 2, either right side or left, sag or overbend and of varying radius as dictated by computer 42 and the orientation of base 76 and frame 72.

Figure 10:
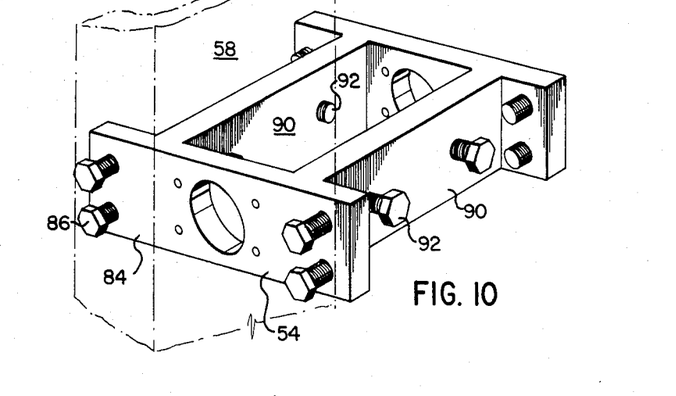

Besides the computer functions which may be carried out during operation of the pipe forming apparatus according to the present invention, it should be noted that shafts 50 of forming rolls 28 may be adjusted in several different manners in their respective chock stands 58. Vertical adjustment, to exert roll pressure on the metal sheet so it may be driven through the mill and properly formed has previously been discussed herein. In addition, however, as can be seen in FIGS. 7, 8 and 9, shafts 50 have bearing chocks 54 at each end. The bearing design is made for a fixed bearing on the outboard chock which is free to float. This is standard metal mill bearing design. The inboard (or driven end) chock 54 (FIG. 10) has flanges 84 which lie above the surface of chock stands 58. In each flange 84 are mounted cap screws 86 threaded through tapped holes in the flanges. When these cap screws are appropriately adjusted in or out, they make it possible to move the flanges laterally in relation to the stands. Since the shaft, bearings and chock are rigidly attached together, the whole shaft moves in or out. Since the rolls are mounted on shafts 50, the center lines of the rolls may thus be moved laterally to coincide with the center line of the mill. This movement is in the horizontal plane. It is necessary to align all the rolls to the center line of the mill for uniform forming and to eliminate uneven horizontal forces which cause the pipe being formed to ripple or buckle or, if not that severe, to put undesirable retained stress in the pipe.

Further, shafts 50 may be pivoted in the horizontal plane to ensure that the shafts are parallel to each other and at right angles to the center line of the mill, so that the metal being formed will roll in the mill and not climb higher on one side than the other when it is being formed into a cylinder. As can be seen from the perspective view of a chock in FIG. 10, the sides 90 of bearing chocks 54 are tapped and provided with cap screws 92 which can be bear on the sides of chock stands 58. By running the cap screws in or out, the chock is moved relative to the stand in a manner which appropriately pivots the shaft at right angles to the center line of the mill.

Figure 12:
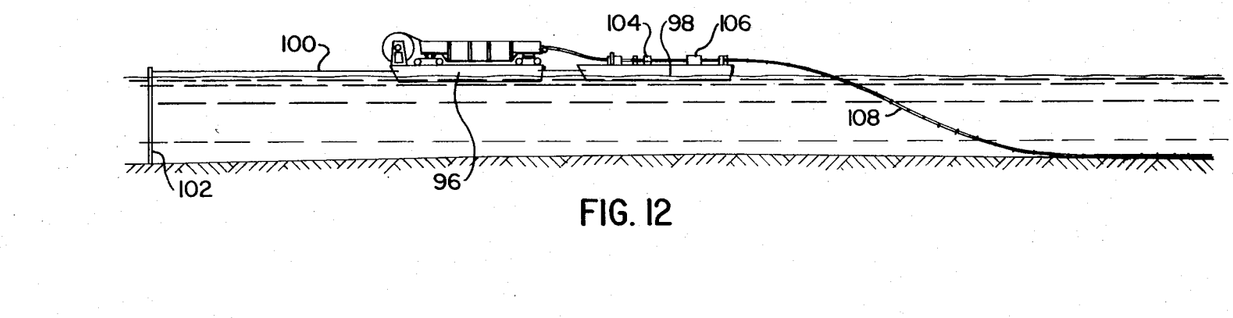
FIG. 12 is a side, schematic view of a pipe forming apparatus according to the present invention on a barge.
Figure 13:
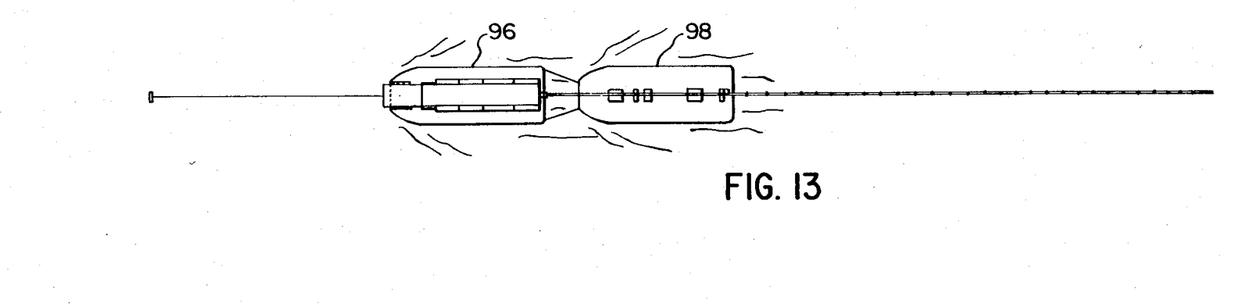
FIG. 13 is a top view of the apparatus of FIG. 12.

Finally, as can be seen in FIGS. 12 and 13, the mobile pipe forming apparatus according to the present invention may be driven onto, or built onto a barge 96, which tows a second barge 98. Barge 96 may be provided with a line 100 which is secured to an anchor 102, both barges being propelled by means of a winch (not shown). The speed of the winch line entering the winch fairlead is preferably the same as the speed of the barge, and may be recorded by the computer 42 which in turn runs the pipe mill at the same lineal speed. Again computer 42 provides the desired weld temperature for the mill speed.

On barge 98, coils of metal which had been made into pipe would be joined by means of mechanical couplings or explosive weld sleeves, or any other fast joining method which would meet the required specifications, while the pipe is moving. The coils of flat metal would be joined in the mill and the joints tested by non-destructive means at testing station 104. A line travel coating machine 106 on barge 98 would remain stationary while the pipe moved throught it to coat the pipe. The coated pipe, non-destructively tested previously, would then be lowered into the water with appropriate weights 108 attached as required.

Alternatively, the mill according the present invention when mounted on a barge could be driven along a water front making long lengths of pipe, the pipe then non-destructively tested, hydro tested, coated and towed to sea in rafts where the long lengths would be joined at sea after plugging the ends by an acceptible joining method, prior to being weighted and lowered to the ocean floor.

Thus it is apparent that there has been provided in accordance with the invention a mobile pipe forming apparatus mobile that fully satisfies the objects, aims and advantages set forth above. While the invention has been described in conjunction with specific embodiment thereof, it is evident that many alternatives, modifications and variations will be apparent to those skilled in the art in light of the foregoing description. Accordingly, it is intended to embrace all such alternatives, modifications and variations as fall within the spirit and board scope of the invention.

What we claimed as our invention:

1. A mobile pipe forming apparatus comprising in combination a carriage, means for propelling and means for steering the carriage and a pipe forming mill supported on the carriage including in spaced sequence a cradle for carrying a coil of an elongated metal strip, means for shaping the metal strip from the coil into an elongated cylindrical member with confronting longitudinally extending edges, welding means to join the longitudinally extending edges of the cylindrical member to form a continuous pipe, and adjustable drive means to pass the strip from the coil through the pipe forming apparatus for shaping and welding and to pass the pipe from the pipe forming apparatus, the improvement characterized by the pipe forming apparatus being further provided with a microcomputer and a temperature sensor device electrically associated with the microcomputer to detect the temperature of the weld during operation of the apparatus and pass that information to the microcomputer, the microcomputer electronically associated with the welding means and programmed to control the heat output of the welding means so that, during operation, the weld temperature is maintained at a predetermined level, the pipe forming apparatus further provided with means electronically associated with the microcomputer for measuring the carriage speed and the pipe manufacturing speed and passing that information to the microcomputer, the microcomputer programmed to control the relative pipe manufacturing speed and vehicle speed to ensure that during operation the pipe manufacturing apparatus moves ahead at an equal speed but in an opposite direction to the metal strip being formed into pipe.

2. A pipe forming apparatus according to claim 1 wherein the welding means is an induction welder and the temperature sensor device is a pyrometer.

3. An apparatus according to claim 1 wherein the means for measuring the carriage speed is a tachometer.

4. An apparatus according to claim 1 wherein during operation the microcomputer controls pipe manufacturing speed by matching that speed to the vehicle speed as a basis of measurement.

5. An apparatus according to claim 1 wherein the means for shaping the metal strip from the coil into an elongated cylindrical member comprises a plurality of shaft mounted forming rolls, the shafts being automatically adjustable in vertical positioning and rotatably held in chocks, the microcomputer controlling the vertical positioning of the shafts in the chocks and hence the roll pressure on the strip during operation.

6. An apparatus according to claim 3 wherein the vertical positioning of the shafts in the chocks is hydraulically controlled.

7. An apparatus according to claim 5 wherein the vertical positioning of the shafts in the chocks is controlled by electrically operated screw jacks.

8. The pipe forming apparatus according to claim 5 wherein the shafts of the forming rolls are provided with a fixed bearing on the driven, inboard end and a closing bearing on the other, outboard end, the chock at the inboard end being provided with lateral adjustment means for adjusting the position of the roll laterally with respect to the direction of motion of the metal through the pipe forming apparatus.

9. An apparatus according to claim 8 wherein the chock of each roll at the inboard end is further provided with adjustment means to enable limited pivoting of the roll in the horizontal plane about the axis of the pipe being milled to ensure that the shafts of the rolls are parallel to each other and at right angles to the centre line of the pipe milling apparatus.

10. A mobile pipe forming apparatus according to claim 1 further provided with a Turk's head mechanism through which continuous pipe is to pass as it leaves the pipe forming apparatus, means electronically associated with and controlled by the microcomputer for adjustably positioning the Turk's head by rotation about a vertical axis passing through the centre of the Turk's head and back and forth movement about an axis at the base of the Turk's head mechanism.

11. A mobile pipe forming apparatus according to claim 1 further provided with a Turk's head mechanism through which continuous pipe is to pass as it leaves the pipe forming apparatus, means electronically associated with and controlled by the microcomputer for adjustably positioning the Turk's head by rotation about a vertical axis passing through the centre of the Turk's head and back and forth movement about an axis at the base of the Turk's head mechanism.

12. A pipe forming apparatus according to claim 1 wherein means is provided associated with the metal coil and electronically associated with the microcomputer to signal when a predetermined amount of metal remains on the coil, to advise the operator when a new coil is about to be required.

13. A mobile pipe forming apparatus according to claim 1 wherein means is provided associated with the metal coil and electronically associated with the microcomputer to signal when a predetermined amount of metal remains on the coil, to advise the operator when a new coil is about to be required.

14. A mobile pipe forming apparatus according to claim 1 wherein the carriage is mounted on a pair of front tracks and a pair of rear tracks, each pair being carried by a separate, rigid carbody, each carbody being secured to the carriage for pivotal movement about a vertical central axis, and each track being driven by a separate DC motor, the speed and direction of which is independently changable and controlled by the microcomputer, the microcomputer controlling the speed and direction of movement of the carriage through control of the speed and direction of movement of each of the tracks.

15. A mobile pipe forming apparatus according to claim 14 wherein the apparatus is provided with a manual steering mechanism for controlling the relative orientation of the front carbody, the microcomputer controlling the relative direction and speed of the front tracks to turn the front carbody and the relative direction and speed of the rear tracks to turn the rear carbody and thereby control the direction of motion of the apparatus.

16. A mobile pipe forming apparatus according to claim 1 wherein the carriage is secured to a boat hull.

17. A mobile pipe forming apparatus according to claim 16 wherein the apparatus is propelled by means of controlled winching of a line secured from the boat hull to an anchor, the microcomputer to record the winching speed and programmed to control the winching speed.

18. A mobile pipe forming apparatus according to claim 16 further provided with means for adjoining lengths of pipes from the pipe forming apparatus during operation.

19. A mobile pipe forming apparatus according to claim 16 further provided with means for testing and means for coating the pipe as it is passed from the pipe forming apparatus.

20. A mobile pipe forming apparatus comprising in combination a carriage, means for propelling and means for steering the carriage and a pipe forming mill supported on the carriage including in spaced sequence a cradle for carrying a coil of an elongated metal strip, means for shaping the metal strip from the coil into an elongated cylindrical member with confronting longitudinally extending edges, welding means to join the longitudinally extending edges of the cylindrical member to form a continuous pipe, and adjustable drive means to pass the strip from the coil through the pipe forming apparatus for shaping and welding and to pass the pipe from the pipe forming apparatus, the improvement characterized by the pipe forming apparatus being further provided with a microcomputer, means electronically associated with the microcomputer for measuring the carriage speed and the pipe manufacturing speed and passing that information to the microcomputer, the microcomputer programmed to control the relative pipe manufacturing speed and vehicle speed to ensure that during operation the pipe manufacturing apparatus moves ahead at an equal speed but in an opposite direction to the metal strip being formed into pipe.

21. A mobile pipe forming apparatus according to claim 20 wherein the means for shaping the metal strip from the coil into an elongated cylindrical member comprises a plurality of shaft mounted forming rolls, the shafts being automatically vertically adjustable and rotatably held in chocks, the microcomputer programmed to control the vertical positioning of the shafts in the chocks and hence the roll pressure on the strip during operation.

22. The mobile pipe forming apparatus according to claim 28 wherein the shafts of the forming rolls are provided with a fixed bearing on the driven, inboard end and a floating bearing on the other, outboard end, the chock at the inboard end being provided with lateral adjustment means for adjusting the position of the roll laterally with respect to the direction of motion of the metal through the pipe forming apparatus.

23. An apparatus according to claim 22 wherein the chock of each roll at the inboard end is further provided with adjustment means to enable limited pivotting of the roll in the horizontal plane about the axis of the pipe being milled to ensure that the shafts of the rolls are parallel to each other and at right angles to the centre line of the pipe milling apparatus.

24. An apparatus according to claim 23 wherein during operation the microcomputer controls pipe manufacturing speed by matching that speed to the vehicle speed as a basis of measurement.

25. A mobile pipe forming apparatus according to claim 20 wherein the carriage is secured to a boat hull.

26. A mobile pipe forming apparatus according to claim 20 wherein the carriage is mounted on a pair of front tracks and a pair of rear tracks, each pair being carried by a separate, rigid carbody, each carbody being secured to the carriage for pivotal movement about a vertical central axis, and each track being driven by a separate DC motor, the speed and direction of which is independently changable and controlled by the microcomputer, the microcomputer controlling the speed and direction of movement of the carriage through control of the speed and direction of movement of each of the tracks.

27. A mobile pipe forming apparatus according to claim 26 wherein the apparatus is provided with a manual steering mechanism for controlling the relative orientation of the front carbody, the microcomputer controlling the relative direction and speed of the front tracks to turn the front carbody and the relative direction and speed of the rear tracks to turn the rear carbody and thereby control the direction of motion of the apparatus.

28. A mobile pipe forming apparatus according to claim 25 wherein the apparatus is propelled by means of controlled winching of a line secured from the boat hull to an anchor, the microcomputer to record the winching speed and programmed to control the winching speed.

29. A mobile pipe forming apparatus according to claim 25 further provided with means for adjoining lengths of pipes from the pipe forming apparatus during operation.

30. A mobile pipe forming apparatus according to claim 25 further provided with means for testing and means for coating the pipe as it is passed from the pipe forming apparatus.

* * * * *